(12) United States Patent
Sutton et al.

(10) Patent No.: US 10,878,292 B2
(45) Date of Patent: Dec. 29, 2020

(54) AUTOMATIC GENERATION OF A NEW CLASS IN A CLASSIFICATION SYSTEM

(71) Applicant: Goodrich Corporation, Charlotte, NC (US)

(72) Inventors: Alexander Charles Sutton, Lowell, MA (US); Suhail Shabbir Saquib, Shrewsbury, MA (US)

(73) Assignee: Goodrich Corporation, Charlotte, NC (US)

( * ) Notice: Subject to any disclaimer, the term of this patent is extended or adjusted under 35 U.S.C. 154(b) by 94 days.

(21) Appl. No.: 16/213,775

(22) Filed: Dec. 7, 2018

(65) Prior Publication Data

US 2020/0184282 A1 Jun. 11, 2020

(51) Int. Cl.
*G06K 9/00* (2006.01)
*G06K 9/62* (2006.01)
*G06N 3/08* (2006.01)

(52) U.S. Cl.
CPC .......... *G06K 9/6276* (2013.01); *G06K 9/628* (2013.01); *G06K 9/6214* (2013.01); *G06K 9/6219* (2013.01); *G06N 3/08* (2013.01)

(58) Field of Classification Search
CPC .. G06K 9/6276; G06K 9/6214; G06K 9/6219; G06K 9/628; G06N 3/08
See application file for complete search history.

(56) References Cited

U.S. PATENT DOCUMENTS

| 7,693,683 | B2* | 4/2010 | Ihara | G06K 9/6215 |
| | | | | 702/179 |
| 8,005,767 | B1 | 8/2011 | Cassella | |
| 9,147,162 | B2* | 9/2015 | Averbuch | G06F 16/353 |
| 9,786,036 | B2* | 10/2017 | Annapureddy | G06K 9/66 |
| 9,898,827 | B2* | 2/2018 | Li | G06K 9/66 |

(Continued)

OTHER PUBLICATIONS

Probabilistic Atlas-guided Eigen-organ Method for Simultaneous Bounding Box Estimation of Multiple Organs in Volumetric CT Images; Cong Yao*1, Takashige Wada*1, Akinobu Shimizu*1, Hidefumi Kobatake*1, Shigeru Nawano*2 (Year: 2006).*

(Continued)

*Primary Examiner* — Khai M Nguyen
(74) *Attorney, Agent, or Firm* — Locke Lord LLP; Scott D. Wofsy; Judy R. Naamat

(57) ABSTRACT

A system and computer-implemented method for automatically recognizing a new class in a classification system. The method includes accessing components of a trained convolutional neural network (CNN) that has been trained with available classes. The components are provided in a kernel space and include at least one of a plurality of kernels and a plurality of neurons of one or more layers of the CNN. Furthermore, the components are assigned to a class in accordance with the training. The method further includes applying a covariance matrix to map the components in the kernel space to eigenspace; determining, for each of the available classes, an eigen-distance between a sample and the components mapped to eigenspace; based on the eigen-distance, determining whether the sample is an outlier that does not belong to one of the classes; and creating a new class that includes the sample if determined that the sample is an outlier.

20 Claims, 6 Drawing Sheets

(56) References Cited

U.S. PATENT DOCUMENTS

| | | | | |
|---|---|---|---|---|
| 2013/0322728 A1* | 12/2013 | Jacobs | ................... | A61B 5/055 |
| | | | | 382/132 |
| 2018/0300624 A1* | 10/2018 | El-Khamy | ........... | G06N 3/0454 |
| 2019/0108444 A1* | 4/2019 | Song | .................... | G06N 3/0481 |

OTHER PUBLICATIONS

Extended European Search Report for European Patent Application No. EP19214534.0, dated Apr. 30, 2020.
Unknown Author: "ODIN: Outlier Detection in Neural Networks" Nov. 26, 2018 (Nov. 26, 2018), pp. 1-17, XP055687537, Open Review Retrieved from the Internet: URL:https://openreview.net/forumid=rkGgLoR5tX; [retrieved on Apr. 20, 2020].
Hong-Ming Yang et al: "Robust Classification with Convolutional Prototype Learning", Arxiv.org, Cornell University Library, 201 OLIN Library Cornell University Ithaca, NY 14853, May 9, 2018 (May 9, 2018), XP080876360.

\* cited by examiner

AUTOMATIC GENERATION OF A NEW CLASS IN A CLASSIFICATION SYSTEM

FIELD OF THE INVENTION

The present technology relates to classification algorithms and, more particularly, methods and systems to automatically generate a new class in a classification system.

BACKGROUND OF THE INVENTION

A model can use a convolutional neural network (CNN) to classify objects. The CNN is trained for a class to correctly identify objects that are a member of the class. However there are situations in which a CNN has not yet been trained for a new class, such as due to insufficient training data, unavailability of training data, or it is impracticable or cumbersome to train the CNN as new classes become available. When a newly observed object is a member of a novel class for which the CNN has not yet been trained, the newly observed object can be assigned with a high level of uncertainty to one of the learned classes, which are classes for which the CNN has already been trained. However, this can make the model fuzzy, meaning its classification becomes less accurate. For example, the fuzzy model can suffer from feature drift, making the differentiation between classes less clear or causing a greater likelihood of misclassification of a newly observed object.

Such conventional methods and systems have generally been considered satisfactory for their intended purpose. However, there is still a need in the art for a system, method, or computer readable medium having programmable instructions to recognize when a newly observed object belongs to a new class for which a CNN has not yet been trained and to correctly classify the newly observed object.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a computer-implemented method for automatically recognizing a new class in a classification system. The method includes accessing components of a trained convolutional neural network (CNN) that has been trained with available classes. The components are provided in a kernel space and include at least one of a plurality of kernels and a plurality of neurons of one or more layers of the CNN. Furthermore, the components are assigned to a class in accordance with the training. The method further includes applying a covariance matrix to map the components in the kernel space to eigenspace; determining, for each of the available classes, an eigen-distance between a sample and the components mapped to eigenspace; based on the eigen-distance, determining whether the sample is an outlier that does not belong to one of the classes; and creating a new class that includes the sample if determined that the sample is an outlier.

In embodiments, determining the eigen-distance for each of the available classes can include determining a singular value decomposition (SVD)-based eigen-distance from the sample to each of the individual available classes.

In embodiments, determining the eigen-distance for each of the available classes can be a function of the mean for each class.

In embodiments, the kernel space can include a kernel matrix for one or more of layers of at least one layer, or a final dense neuron output layer.

In embodiments, the method can further include clustering points in the eigenspace into a plurality of clusters, determining a hierarchical closeness of the plurality of clusters in Euclidean space, and creating a taxonomy based on the hierarchical closeness of the plurality of clusters.

In embodiments, the method can further include determining a class of the available classes having the shortest eigen-distance to the sample, sorting components that are members of the class based on their eigen-distance to a reference point of a mapping of the class in the eigenspace, determining loosely associated components of the class based on the sorting of the components and a threshold, and comparing an eigen-distance of the sample to the reference point to the eigen-distance to the reference of the loosely associated components, wherein determining whether the sample is an outlier can be based on a result of the comparison.

In embodiments, the method can further include determining the reference point for the mapping of the class of the available classes in the eigenspace, wherein the class having the shortest eigen-distance to the sample can be determined as a function of a distance of the sample to the reference point of the mapping of the class.

In accordance with another aspect of the disclosure, a classification system is provided to automatically generate a new class in a classification system. The system includes a memory configured to store instructions and a processor disposed in communication with the memory. The processor upon execution of the instructions is configured to perform the operations of the method.

In accordance with still another aspect of the disclosure, a non-transitory computer readable storage medium and one or more computer programs embedded therein are provided. The computer programs include instructions, which when executed by a computer system, cause the computer system to perform the operations of the method.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
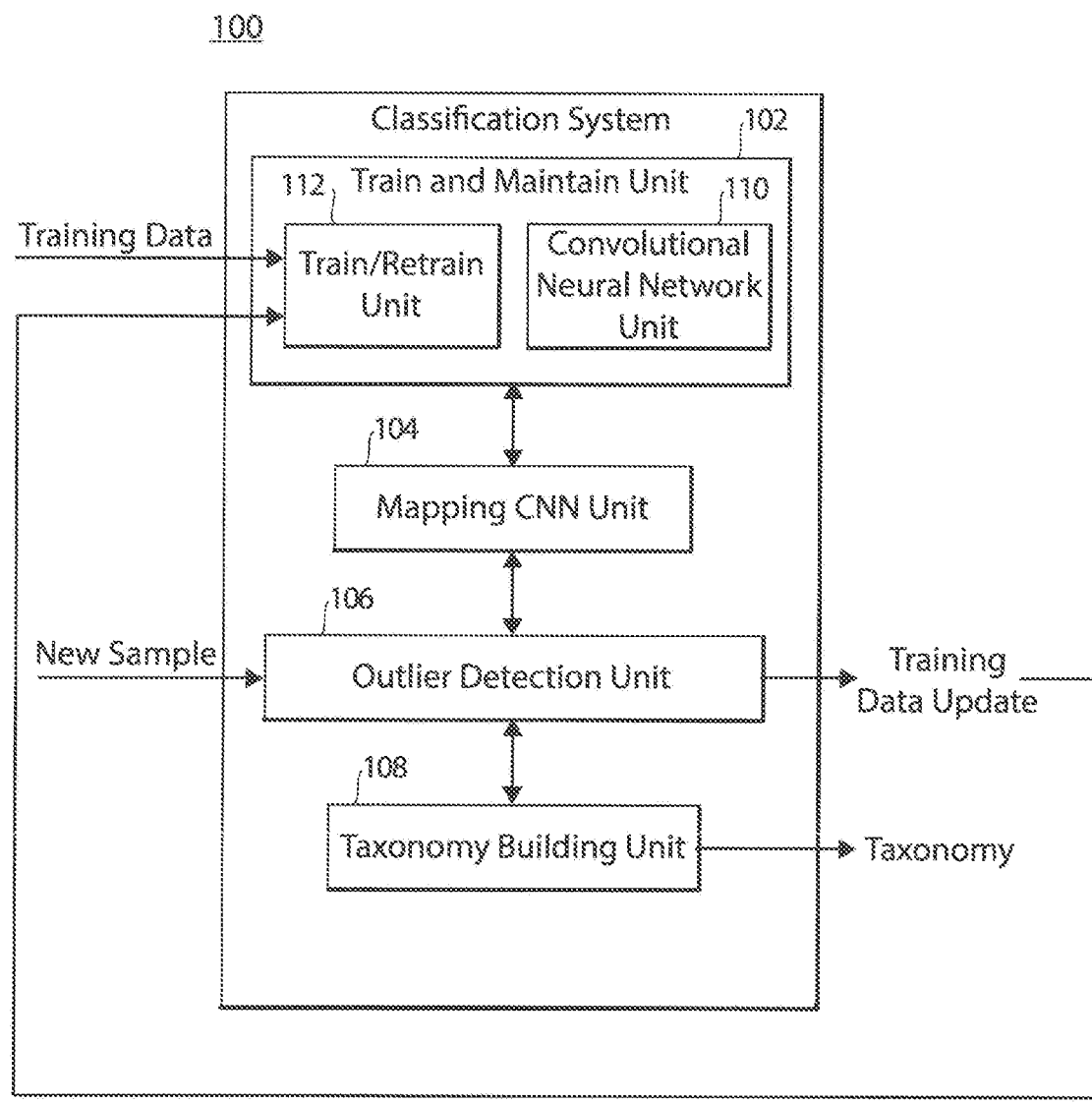
FIG. 1 illustrates a block diagram of a classification system in accordance with an illustrative embodiment of the present disclosure.

Reference will now be made to the drawings wherein like reference numerals identify similar structural features or aspects of the subject disclosure. For purposes of explanation and illustration, and not limitation, a block diagram of an exemplary embodiment of a classification system in accordance with the disclosure is shown in FIG. 1 and is designated generally by reference character 100. Other embodiments of the classification system 100 in accordance with the disclosure, or aspects thereof, are provided in FIGS. 2-7, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Taxonomies are used for generalizing classification results and contextualize new observations. Often a new observation to be applied to a taxonomy may be a member of a novel class that the classifier has not seen before, causing an incorrect assignment.

A convolutional neural network (CNN) is configured to correctly identify members from a training class that it was trained with. However, if a new class is similar to training classes that were used to train the CNN, then feature representations of the learned classes (meaning the training classes once they have been learned by CNN through its training) may be used to help classify a new sample. For example, classification systems that are tasked with distinguishing car makes (e.g., Ford, Toyota, Hyundai) have kernels that activate when convolved with certain car features of a new sample, such as wheels, windows, etc. When the new sample input to the classification system includes an image of a new car make that was not learned by the CNN, the CNN can activate certain kernels that converged when learning (meaning during the training) certain makes but not others. Classification system 100 uses kernel activations from layers of the CNN, including kernels from lower layers, to find the relationship between the new sample and learned classes, and designate it as belonging to a new class, if appropriate.

In an example classification system, the classification system can be trained to distinguish 2018 Ford F-150s from 2018 Chevrolet Silverados. The classification system can lose some of its predictive power when presented with a new sample, such as a 2019 Ford F-150, which looks slightly different than the 2018 vehicle. The classification system may classify the 2019 F-150 as a 2018 F-150, but with less confidence, which may satisfy the objective. But it would be even more useful to note that the new sample is most similar to the 2018 Ford F-150 but likely represents a new class. In this case, the new sample would be categorized as a new class instance and the CNN can be retrained automatically with updated training data that represents the new class.

In embodiments, classification system 100 is configured to determine when a new sample will be categorized as a new class and to automatically retrain the CNN with updated training data that represents the new class. Classification system 100 achieves this by re-mapping image space by plotting activations from n kernels (or n "neurons" of any layer or combination of layers) into an n-dimensional space, also referred to as a kernel space, and then applying a singular value decomposition (SVD) (similar to principle component analysis (PCA)) on a class-by-class basis.

Kernel space can refer to one (or both) of two high-dimensional spaces. In one case, kernel space is the summed product of the convolution of an image with a smaller kernel matrix, producing one dimension per kernel. For example, an n×n image convolved with a q×q kernel with zero padding and stride of 1 produces a Q×Q matrix (Q=n−q+1); this matrix is then summed (for example) to yield the value of this kernel's "dimension" (other aggregation functions can be used, such as mean, range, etc). On the other hand, kernel space can be the simple inner product of an image (or image intermediate, such as is computed by neuronal layers after activation functions) and a neuron (or matrix); in this case, the dimension of the kernel space is the number of neurons. For example, the inner product of a flattened n×n image (of dimension 1×n$^2$) and an n$^2$×k neuron is a k-dimensional space. The preferred embodiment is a simple variation of this second type of kernel space.

In this reduced space, linear combinations of "kernel" space dimensions form an orthonormal basis that preserves most of the information and variance between objects of the class being examined in fewer dimensions. Eigenvectors form this orthonormal basis, which is referred to as an eigenspace. A new sample can be passed through the same process and mapped to the same eigenspace. It can be determined from this mapping whether the new sample belongs to a learned class or a new class. The determination uses eigen-distance, which is redefined as being measured from the mapped new sample to a center of a mapped class in the eigenspace.

Classification system 100 includes a train and maintain unit 102, a mapping CNN unit 104, an outlier detection unit 106, and a taxonomy building unit 108. As an overview, with greater detail provided below, in embodiments, the train and maintain unit 102 includes a CNN unit 110 that access a CNN, and a train/retrain unit 112 that trains and maintains the CNN. The CNN is used for classification and can be self-contained. Learned kernels (or neuron weights) of the CNN can be used by mapping CNN unit 104 and/or outlier detection unit 106.

The kernel and neuron weights are learned through iteratively evaluating the model's predictions relative to the ground truth and adjusting the kernel/neuron weights to minimize the difference between prediction and actual, using a method referred to as back-propagation. Variants of gradient descent are used to converge on matrix weights so the error gradually decreases. As a result of this method, certain kernels and neurons tend to converge on weights that maximize their responses to certain classes or class attributes. For example, very early kernels often self-assemble into edge detectors which are maximally activated when convolved with an image with one or more edges. Later neurons are more discriminative and may activate only to one class, while other neurons will activate with other classes.

The mapping CNN unit 104 maps the learned kernels or neuron weights to an eigenspace, which can be performed by computing eigen-distance for each class or by applying an SVD implementation on a kernel/neuron activation space on a class-by-class basis, which provides eigenvectors ($\lambda_i$) and unitary representations of the kernel space.

The outlier detection unit 106 computes an eigen-distance metric $\delta_i$ for the eigenvectors $\lambda_i$, which is used to measure an $L_2$ distance in eigenspace of a reference point associated with each mapped class. The mapped classes can be clustered using eigen-distances, and the reference point can be a center of the mapped class clustered each class, also based on eigen-distance. For each new sample provided to the outlier detection unit 106, a determination is made whether the new sample represents a member of a learned class or a new class. If the new sample represents a member of the learned class, it is processed by the CNN to add it as a member of the learned class. If the new sample represents a new class, it is presented as training data to the train/retrain unit 112 for retraining the CNN in order that other new samples received that belong to the new class can be correctly classified.

The taxonomy building unit 108 generates and updates a taxonomy to show relationships between learned and new classes. The taxonomy can be updated at any time.

Regarding the train and maintain unit 102, the CNN accessed by the CNN unit 110 is used to categorize learned classes and identify new classes. The algorithm leverages kernels and/or neurons optimized for certain features and/or classes to classify samples into known classes or new classes (as provided in this disclosure) based on the existence of some previously-learned features combined in novel ways. The CNN can be configured to be suited to the particular application it is to be used for. In the current example, the CNN is a simple network with two hidden layers and one fully connected output layer that maps to learned classes. The CNN unit 110 can access the learned kernels and neurons, which will be used for high-dimensional representation of learned classes. Each of the kernels and neurons can be available to contribute a dimension to a "kernel space," regardless of the number of layers. The outlier detection unit 106 and taxonomy building unit 108 can be agnostic to CNN hyper-parameters (such as training epochs, layer architecture, etc.). In the present example, a well-formulated CNN with converging weights is used. Aspects of the CNN and its training data can be described as follows:

$X_{nm}$—training data, matrix of n samples and m features
$W^{j,i}$—kernels k from layer i to j
$W_{K=k}$—kernel k:k in (1,K) (all kernels concatenated along dimension 3)

It is noted that the method used is agnostic to activation functions, bias terms, or other CNN hyper-parameters. Rather, the method uses kernels, neurons, and/or a final mapping generated by the CNN unit 110.

The train/retrain unit 112 can be used to train an N-layer CNN to a desired accuracy. Once trained, the CNN is sufficient to categorize objects that were used to train it.

Accessing the components of the trained network is essential, and there are multiple points for the user to access output from the neural network. Early layers provide descriptive features while later layers provide more discriminative features, and output components from multiple layers may be combined for improved predictive power. Once a component set is chosen, the user processes the output of the training data from the component set. For a convolutional layer, the output is the training data convolved with the kernels from that layer. The preferred embodiment/approach is to take the output from the final or final two layers, the dense neuronal matrices.

In accordance with different embodiments for evaluation of class membership, final and/or pre-final kernel and/or neuron outputs from the CNN can be used to map new and existing classes to a kernel space. In embodiments, the kernel space can be high dimensional, such as having a dimension that corresponds to each of the activations of all kernels and/or neurons by applying the mapping to all layers of the CNN and accessing all of the kernel or neuron outputs. In embodiments, the kernel space can be n dimensional (where n is the number of classes), by only accessing the final dense neuron output layer.

In the course of training, the CNN is configured to have weights associated with respective kernels and neuron-to-neuron connectivity. Each layer includes either a kernel matrix or a neuron (high-dimensional) matrix, or both. Each image of the training data yields outputs for every kernel and every neuron, including the final neuron of the final dense neuron output layer. These outputs are mapped as probabilities of the test image to every training class. In embodiments, outputs can be gathered from any combination of layers of the CNN. In the example shown, only the final dense neuron output layer is used, which has shown advantages of improving discriminability.

In an embodiment that uses kernels, it is noted that kernels typically have a reduced dimensionality relative to the input image. For example, a kernel may be just 2×2 or 3×3 in size. Except in special circumstances, convolution of an image with a kernel produces a matrix of dimension 2 or more representing the activations of that kernel with each region of the image. In order to make the number of dimensions manageable, kernel activations, which themselves are matrices, are reduced to scalars. This reduction can be done by summing raw activation values or summing mean-subtracted activations, which yields, for each image, a scalar for each kernel. A layer with j kernels will produce a j-dimensional activation/kernel space. However, the activations from multiple layers can be combined, and can be further combined with outputs from neurons.

With reference to an embodiment that uses neuron output, neurons perform a simple inner product that linearly combines outputs of other neurons or kernel activations. A neuron layer can be any size, regardless of the number of classes or size of the input image. The output of a neuron is a u-dimensional space, where u is the size of non-contractible dimensions. For example, an input to a neuron may be 10 kernels, each producing a 10×10 "image" matrix, resulting in a 10×10×10 input matrix. The neuron may densely (that is, all-to-all) map that 1000-dimensional input to 5000 dimensions or 50 dimensions. In a dense neuron, every scalar of the 10×10×10 input matrix has the potential to contribute to every value of the output (whether it is 5000 or 50 dimensions). Whatever the output dimension space, this can be captured and supplied to the class outlier method, or combined with other neurons, etc.

With reference to an embodiment that uses the final dense layer neuron output, the final layer is no different than the neurons described above except that its dimensionality is defined as the number of classes in the training set. Loss functions and optimization algorithms used during training operate by back-propagating errors. Accordingly, the last layers often contain the most salient mappings and the most effective ways to reduce the dimensionality of the input data set. The result of the final layer is a generally a "confidence" of whether the test image y belongs to each class, or the extent to which y resembles the training data from that class. This provides a relatively low-dimensional description of the input image in terms of its relationship to the training (or learned) classes, and is typically the most informative layer. The output of this final neuron can be used by the outlier detection unit 106. Penultimate layers are also very informative and may be included to increase the dimensionality and discriminability of the classes.

Now with reference to mapping CNN unit 104, it performs an eigen-decomposition process to find the distance in the high-dimensional "kernel space" between an unknown data point that corresponds to a new sample and each of the respective classes. A covariance matrix Σ of a class in "kernel space" is used to scale differences between the class being examined and the unknown data point by directions of greatest variance. This nuance demonstrates a difference between raw distance and eigen-distance. This difference can be appreciated by comparing sloppy dimensions, which are defined herein as admitting to large variance in data of learned classes, and sensitive dimensions, which are defined herein as not admitting to large variance in data of the learned classes. Importantly, the covariance matrix Σ allows for these sloppy and sensitive dimensions to include combinations of several kernels, neurons, and/or layers. As such, these dimensions do not need to align with kernel/neuron/layer activation dimensions.

Eigen-distance can be determined in several ways. In one embodiment, eigen-distance is determined using a class-by-class approach in which the following metric is computed for each class k in accordance with Equation (1):

$$(y-\mu_k)^T \Sigma (y-\mu_k)), \quad (1)$$

where $\mu_k$ is the centroid of class k, y is the new sample/data point, and Σ is the covariance matrix as defined above. In this approach, no explicit transformation to eigenspace is necessary. Instead, the distances are calculated for each dimension of the sample object relative to the covariance of that dimension. Using the covariance matrix obviates the need to calculate any coordinates, and the resulting value is an instance of the eigen-distance.

For clarity, X is the raw input image and Q is the output of a neuron/kernel layer. The result of this calculation is the eigen-distance with respect to class k. To generate a distance vector $D_k$, where $D_k$ is the eigen-distance from y to a reference point of the kth class, the class of comparison for y is $$\min_k(D_k).$$

The reference point can be, for example, the centroid, or mean of the class. For calculating outlier criteria, a ranked vector of results of Equation (1) is applied iteratively to each element $x_{k,i}$ in the closest class (k), yielding an ordered list of elements' eigen-distance from the cluster reference point. In this way, a closest point $Q_1$ to the centroid is listed first and a point at the 100th eigen-distance percentile $Q_N$ is listed last.

In another embodiment of determining eigen-distance, SVD is applied to create p eigenvalues (in a p-dimensional space) and p eigenvectors described by Equation (2):

$$Q = USV^T, \quad (2)$$

where Q is the output of a neuron/kernel layer (as above), U is a n×p unitary matrix, S is the p×p diagonal matrix of singular values and V is the p×p matrix of singular vectors. Eigen-notation is used, i.e.: referring to singular values $s_p$ as eigenvalues $\lambda_p$ and singular vectors as eigenvectors, since the two are related by Equation (3):

$$\Sigma = \frac{VSU^T USV^T}{n-1} = V \frac{S^2}{n-1} V^T, \quad (3)$$

where Σ is the symmetric p×p covariance matrix.

The n×p input data Q is represented in principal component space as U. Note that in embodiments, not all eigen-dimensions need be used if the dimensionality of the space is too great and there is a sharp decline in eigenvalues.

Conceptually, we are interested in mapping a new sample y onto the eigen-space created above and quantitatively comparing it to the existing class, and the comparison is done class-by-class. The SVD-based eigen-distance is calculated using Equation (4):

$$D = \sum_{p=1}^{N} \frac{y_p s_p}{U_p} \quad (4)$$

By iteratively processing the classes in a loop, it is possible to determine which class is closest to the sample in SVD eigenspace. Once the closest class has been found, the SVD eigen-distance can be calculated iteratively for all members $Q_i$ in class k and then sorted, e.g., in ascending order, forming an ordered list of eigen-distances. The method performed by the outlier detection unit 106 can use this ordered list and the eigen-distance to the new sample y to determine whether the new sample is an outlier relative to the closest class.

Once the classes are mapped in eigenspace, the new sample is processed using the same components (e.g., kernels, neurons, final dense neuron) that were used to generate the eigen-distances for the learned classes. The new sample is thus processed to map the new sample onto the eigenspace and calculate its eigen-distance relative to the mapped learned classes. The eigen-distances determined are used to classify the new sample as an instance of one of the learned classes or as a new class.

Figure 2:
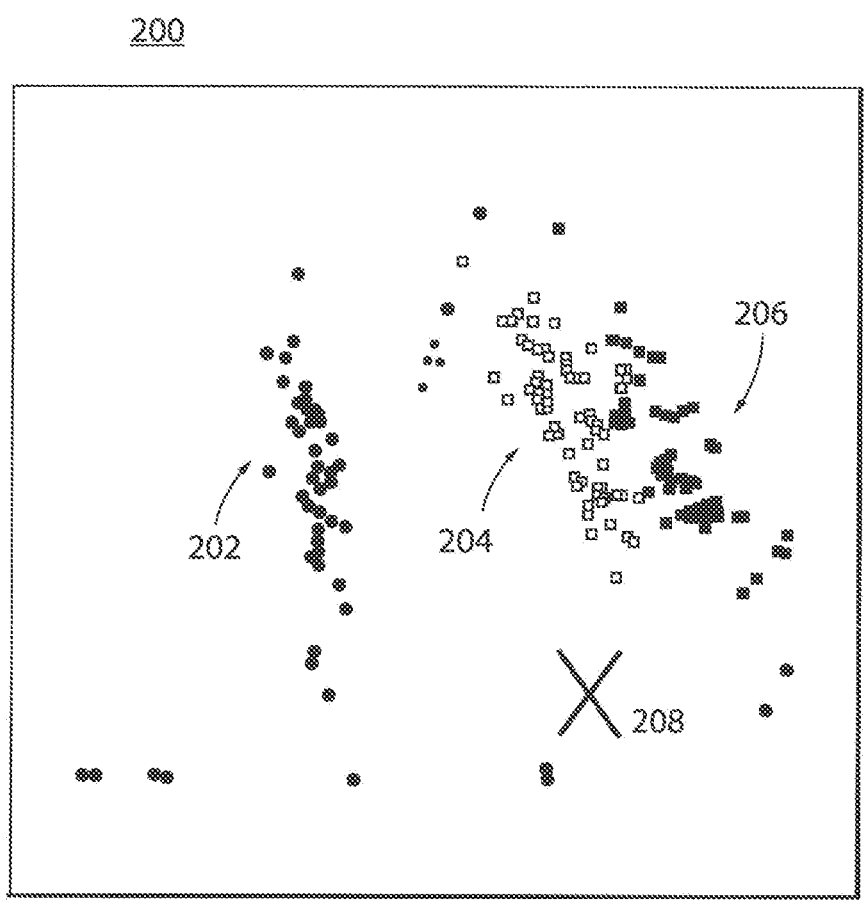
FIG. 2 illustrates an example of an eigenspace with learned classes and a new sample mapped to the eigenspace in accordance with an illustrative embodiment of the present disclosure.

FIG. 2 shows an example eigenspace mapping 200 that includes class mappings 202, 204, and 208 that correspond to three respective different classes. New sample 208, marked as "X", is shown mapped in the eigenspace mapping 200.

Figure 3:
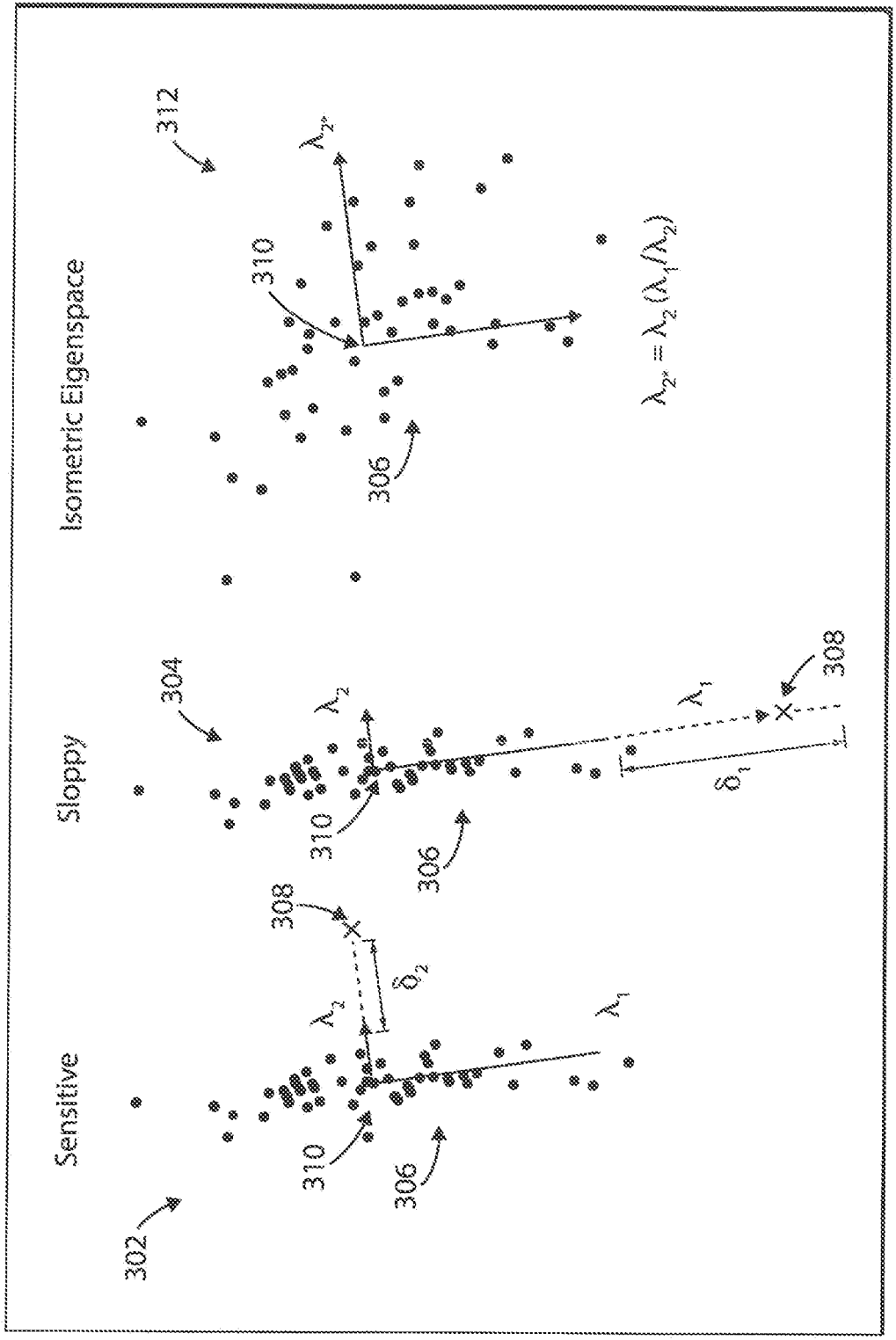
FIG. 3 illustrates an example of eigen-distance measurements an eigenspace with learned classes and a new sample mapped to the eigenspace in accordance with an illustrative embodiment of the present disclosure.

FIG. 3 shows an example mappings 302 and 304 in eigenspace that each include a class mapping 306 and a mapped new sample 308 (that represents y) marked as "X". Mapping 302 uses sloppy dimensions and mapping 304 uses sensitive dimensions. A sensitive dimension has a smaller variance relative to other dimensions, whereas a sloppy dimension has a larger variance relative to the other dimensions. An absolute distance in the sensitive mapping 304 from a reference point (e.g., centroid 310) of the class mapping 306 to the new sample 308 is less than the absolute distance in the sloppy mapping 302 from the reference point (e.g., centroid 310) of the class mapping 306 to the new sample 308.

FIG. 3 shows that in the sensitive mapping 302 the absolute distance from centroid 310 to new sample 308 is equal to $2\delta_2$, while in the sloppy mapping 304 absolute distance from centroid 310 to new sample 308 is less than $2\delta_1$. However, given the larger eigenvalue scalar $\lambda_1$ in dimension 1, space is weighted in dimension 1 to reduce the distance metric $\delta_1$. All dimensions are scaled along their unit vectors by $\max(\lambda)/\lambda_i$ to equal the largest distance metric. The coordinates of the data points are adjusted based on this ratio. In this case, $\delta_2$ is the smallest scaled vector. Using this metric, an isometric eigenspace 312 is created that allows use of a standard Euclidean distance metric while preserving dimensional variance. This task is compatible with both embodiments described above for determining eigen-distance. In the isometric eigenspace 312, the samples are plotted relative to eigenvalue scalar $\lambda_1$ and eigenvalue scalar $\lambda_2^*$, wherein $\lambda_2^* = \lambda_2(\lambda_1/\lambda_2)$.

A determination of whether the new sample is an outlier can be a function of the distance y of the test sample to the reference point of the nearest class k, as well as an ordered eigen-distance of all members of class k to that same reference point. The class mapping having the smallest eigen-distance from its reference point to the new sample is a candidate class to which the new sample may belong. Then a determination is made whether the new sample belongs to the candidate class by comparing the eigen-distance from the new sample to the reference point of the candidate class to an eigen-distance that corresponds to a threshold of the eigen-distances in the ordered list of eigen-distances. The threshold can be a user selected threshold that is a function of a percentile of the ordered list, such as $2 \times 90^{th}$ percentile. When ordered by increasing eigen-distance from the class centroid, taking the $90^{th}$ percentile of that list as the threshold and 2 as the multiplier yields the required class limit. Note that the eigen-distance metric is agnostic to the dimensions that contribute to the distance; the $90^{th}$ percentile can be in one dimension or hundreds, although the figure shows the samples along isolated axes. In reality, the eigen-distance is a sum of component eigen-distances calculated from each dimension.

In embodiments, the threshold is $2\delta_k=2$ (0.9), meaning for class k any new sample with an eigen-distance of $\geq 2 \times 90$th percentile of an ordered list $D_k$ of eigen-distances is considered an outlier and therefore part of a new class. This ensures that new samples which extend the class bounds but lie in sloppy dimensions are not discounted more than samples in sensitive dimensions.

As an example:
$D_k=\{1.4, 1.7, 1.9, 1.9, 2.1\}$, which includes ordered eigen-distances from the centroid of class k to training data samples that belong to class k, wherein k was determined to be the closest class in eigenspace to the new sample
$D_y$: the eigen-distance of the new sample y to the centroid of class k=3.8
Applying the method, the 90th percentile of $D_k$=2.02, so
$\delta_k$=2.02
$\delta_k$=4.04
3.8<4.04

Accordingly, the outlier test failed and the new sample is classified as an instance of class k. On the other hand, if the eigen-distance of the new sample y to the centroid of class k is more than $2\delta_1$ from class k's reference point, it is determined that the new sample y belongs to a new class. If a new class is created, it can be labeled by simple modification of the closest class or via a taxonomical approach.

In accordance with the above example, when a new sample y has an eigen-distance $D_y$, and $D_y > 2\delta_k$, it is determined to create a an instance of a new class. In general, this class can be referred to as a spin-off of the nearest class (k), perhaps $k_1$. Upon reporting output, a taxonomical description of the new class can be determined more accurately using the method described below for updating the taxonomy. In the meantime, the sample y is appended to X and the class label is appended to the training set. At this point, the user has two options:

Fast-training: Retrain the network using the previous solution as a seed

Slow-training: Retrain the network, first re-initializing matrix weights to random values.

The fast-training approach does not compromise accuracy with every other class; however, the CNN may reside in a local optima that could cause slow learning of the new class $k_1$. On the other hand, slow-training can force the network to incorporate $k_1$ into its kernels and neurons, but at the expense of a much longer training period. Using either approach, more new samples that belong to $k_1$ can create a robust representations of the new class $k_1$. An immediate effect, however, includes inhibition of feature drift because confounding features of $k_1$ will not be learned by neurons trying to predict k.

With reference now to the taxonomy building unit 108, building a taxonomy can be used to contextualize a new class. In addition, building the taxonomy, the taxonomy building unit 108 can optionally determine whether to combine or separate newly added classes for solving an unsupervised clustering situation, which is not require for, but can enhance automatic class generation or retraining of the CNN. Two methods for solving an unsupervised clustering situation include a KMeans with silhouette optimization method and a community-based graph theoretical method.

A method that uses unsupervised K-means with silhouette optimization, where points are randomly assigned to a class and a K-means optimization is performed, tries to assign all available data points to a cluster associated with a class while minimizing variance within a cluster. Once the configuration has converged, a silhouette score is generated by comparing the average distance from a data point $x_i$ to (a) all other points within the same cluster and (b) all other points of the next nearest cluster. This can be expressed as follows:

$$s(i) = \frac{b(i) - a(i)}{\max\{a(i), b(i)\}}, \quad (5)$$

where s(i) is the silhouette score of point $x_i$, and a(i) and b(i) are defined as above (a and b, respectively). This is repeated for all points $x_i$ in all clusters or a large subset of the clusters. Scores range from [−1,1] and a higher score indicates a better fit.

Starting with the number of known clusters in the training data, a number of clusters "guess" is incremented, followed by K-means optimization and silhouette scoring, until a ceiling threshold number of clusters has been met (e.g., no more than twice the number of current classes). The cluster configuration that generates the largest silhouette score is accepted. However, if the configuration violates either the outlier assessment or the existing class definitions, the original class assignments are superimposed on the results.

Louvain community detection provides a method that uses community detection. In Louvain community detection a graph theoretical approach is used to unsupervised clustering. An all-to-all undirected graph is created between every data point with weighted edges equal to the Euclidean distance in the isometric eigenspace. A minimum threshold for edge weight is enforced at the 10th percentile and all weaker edges are removed. Louvain modularity seeks to create cluster configurations that maximize edge strength and density within a cluster compared to the overall graph by applying Equation (6):

$$Q = \frac{1}{2m} \sum_{i,j} A_{ij} - \frac{k_i k_j}{2m} \delta(c_i c_j), \quad (6)$$

where
$A_{ij}$ is an edge weight between nodes i and j
$k_i$ is a sum of the weights of edges connected to node i
m is a sum of the weights in the graph
$c_i$ are communities of the nodes, which change as the algorithm progresses
$\delta( )$ is a delta function, which is 1 if a link exists between node/community i and j and 0 otherwise The Louvain modularity is then summed for the graph and output as the index. This process is iterated through the edge weights at 10-percentile intervals, keeping the clustering configuration that generates the best modularity index.

The taxonomy building unit 108 can use hierarchical clustering to generate relationships in a taxonomy. Taxonomy building can be performed without interrupting the method performed by the train and maintain unit 102, mapping CNN unit 104, and 106 outlier detection unit 108. The taxonomy can be generated repeatedly and as often as desired. In effect, the taxonomy can offer a point of comparison between CNN states and helps to contextualize the addition of new classes. The classification system 100 assigns all data points to a cluster. If the outlier assessment detection unit 106 has identified one or more new classes, some clusters may contain only a single data point. For each cluster, a reference point, e.g., centroid, is generated and used in place of the full cluster.

Using the nearest-neighbor clustering algorithm and proceeding in isometric eigenspace:
1. For each centroid, find the closest neighbor in Euclidean space
2. Fuse the two centroid that were the closest, and set the new entity's "centroid" as the Euclidean centroid of the fused clusters
3. Repeat until all cluster entities have been fused The result is a hierarchical dendrogram that gives a general relationships between the clusters, such as for display and visualization of definition of relationships. The CNN and taxonomy can be used to provide search results, tag or label images, obtain information from images that can be used to make decisions or control systems, deep learning, display and visualization of relationships, etc. An application of this approach includes automatic assembly of classes and a means of quantifying their interrelationships. The algorithm described above can be used to measure the similarities of classes, so that two kinds of objects can be numerically compared. This taxonomical structure and comparison mechanism can be applied to any high-dimensional object that is not easily comparable, such as images, time series and signal data, human speech, text documents and web pages, and ingredients and materials lists.

The classification system 100 can process new samples and automatically determine whether individual new samples belong to a learned class or a new class of the CNN, create each determined new class, add the individual new samples to an appropriate learned or new class, retrain the CNN with each new class that is added, and optionally update a taxonomy that represents the CNN. Since the classification system 100 can operate autonomously without the need for human intervention it can be particularly useful in application in which knowledge about new classes is not available or the classification system is deployed in the field such that external intervention for reconfiguration and updates associated with new classes is not realistic or is impracticable. Accordingly, this method avoids problems associated with feature drift or misclassification of new samples caused by input of new samples that belong to new classes when reconfiguration for such new classes is not performed.

For example, in an automatic target recognition (ATR) engine may detect a tank and identifies it as an M1A1. In some operations, this is sufficiently accurate that even if the tank is really an M1A2 the objective is still met. However, two problems can arise from this inaccuracy. First, at some point differences between new models will be noted. Historically, an analyst would need to retrain the model. Second, successive changes to future tanks, decoys, or equipment, which can now be developed at fast rates faster (such as to modify existing targets) can cause "feature drift." The feature representations of M1A1s could then become less accurate over time.

On the contrary, classification system 100 not only provides solutions, if further provides a sharpening effect in which differences that differentiate classes that can be learned by the CNN can become finer. Consider two M1A2 tanks that have different squadron decals on the barrels. A classifier distinguishing M1A1 and T72 tanks may not learn a kernel to identify a fine feature, such as barrel decals. However, over time the classification system 100 can sharpen its ability to discriminate between similar classes based on such fine features as a decal on a barrel.

Use of SVD/PCA rather than use of a Fischer's linear discriminant analysis (LDA) has particular advantages. LDA would linearly combine kernel space dimensions to most efficiently represent differences between classes. Although LDA can use class convergence to learn the kernels, since it is unknown how a new class would be represented in kernel space, leveraging kernel activation variance has advantages over using interclass variance. Were LDA to be used while leveraging kernel activation variance, the CNN could be doubly penalized when processing a new sample that has not yet been seen.

A further advantage is that clustering algorithms used to cluster classes in the eigenspace would not override learned class designations or outlier assessment. For example, when a new sample is classified as A by the CNN and the outlier assessment does not identify it as a new class, it will remain type A. Even if the clustering algorithm thinks y should belong to class B, it cannot override the CNN. Similarly, if the clustering algorithm tries to classify some points that were identified as A in the training set as B, this will not be allowed. While such expediencies may be accepted during clustering to allow the clustering algorithm to converge, they are not reflected in the final state of the model.

In a scenario in which there are a small number of learned classes, high-dimensional separation of features can be created by adding as many other classes and training samples as possible. This can increase dimensionality of the final neuron will be increased. The CNN may lose some discriminability when beginning with a smaller subset. When the new class is suspected to be highly similar to the training classes, it is preferable to train the CNN by using a larger set of training data.

For example, if a training data set is limited to a motorcycle and a boat, it can be relatively uninformative when a pickup truck new sample is presented to the classification system 100. However, if the learned classes also include sedans and tractor-trailer trucks, the pickup truck new sample can be processed to generate a new class that will probably land somewhere between the tractor-trailer truck and the sedan, rather than between the motorcycle and the boat.

There can be advantages in certain scenarios to using the final layer over early layers of the CNN. Early layers often learn representative features of data while later layers learn discriminative features. Therefore, later layers continue to develop separability, culminating with the final layer, which is presumably the best at distinguishing classes. In certain scenarios, the final layer may have a low dimensionality. In this case, it can be beneficial to add layers from the latter part of the CNN to provide additional dimensionality. In some cases, use of early layers may provide more predictive power.

Figure 4:
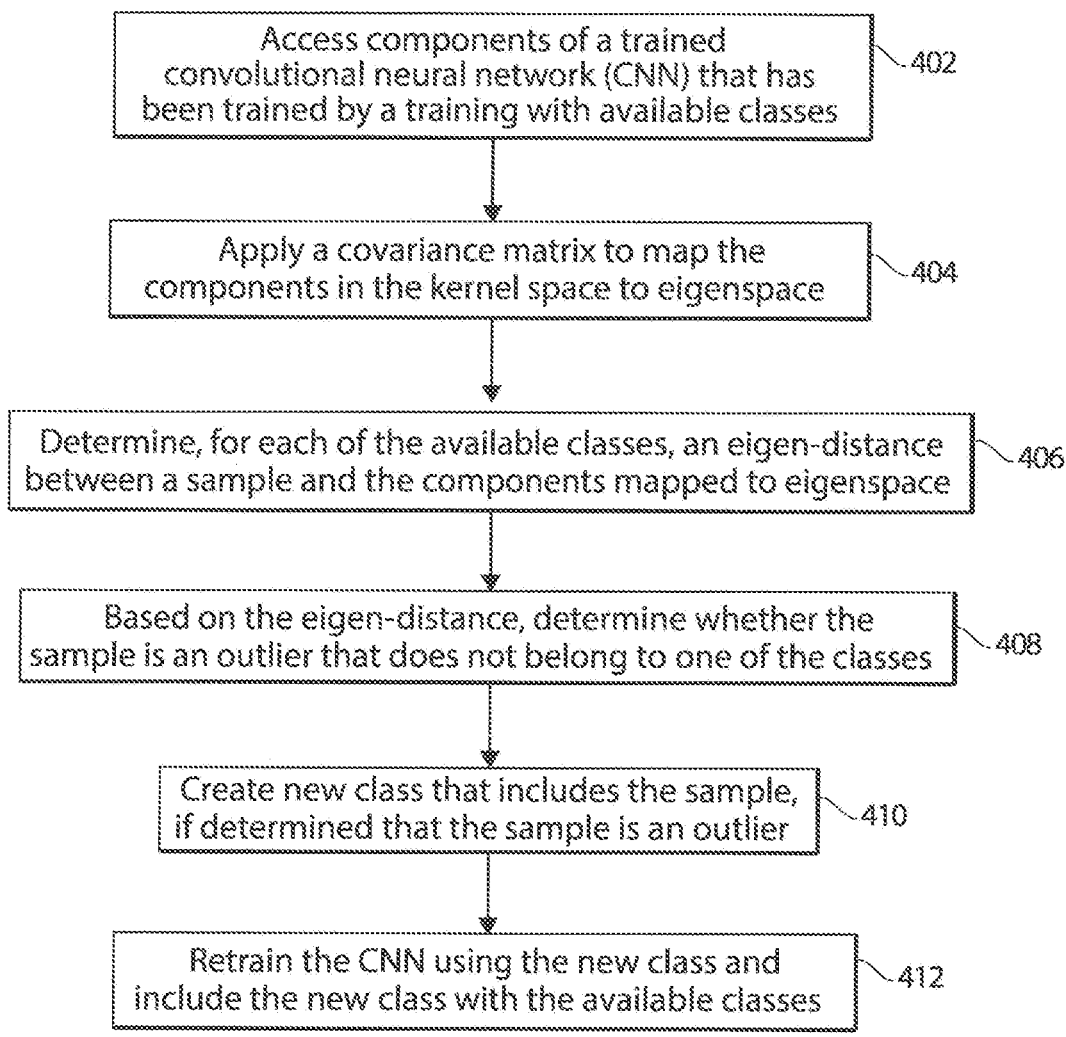
FIG. 4 illustrates a flowchart showing an example method performed by the classification system in accordance with embodiments of the disclosure.
Figure 5:
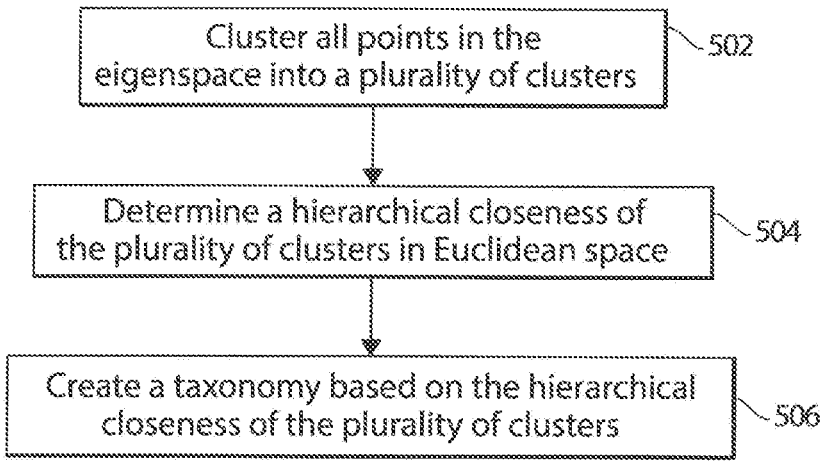
FIG. 5 illustrates a flowchart showing an example method performed by the classification system in accordance with further embodiments of the disclosure.
Figure 6:
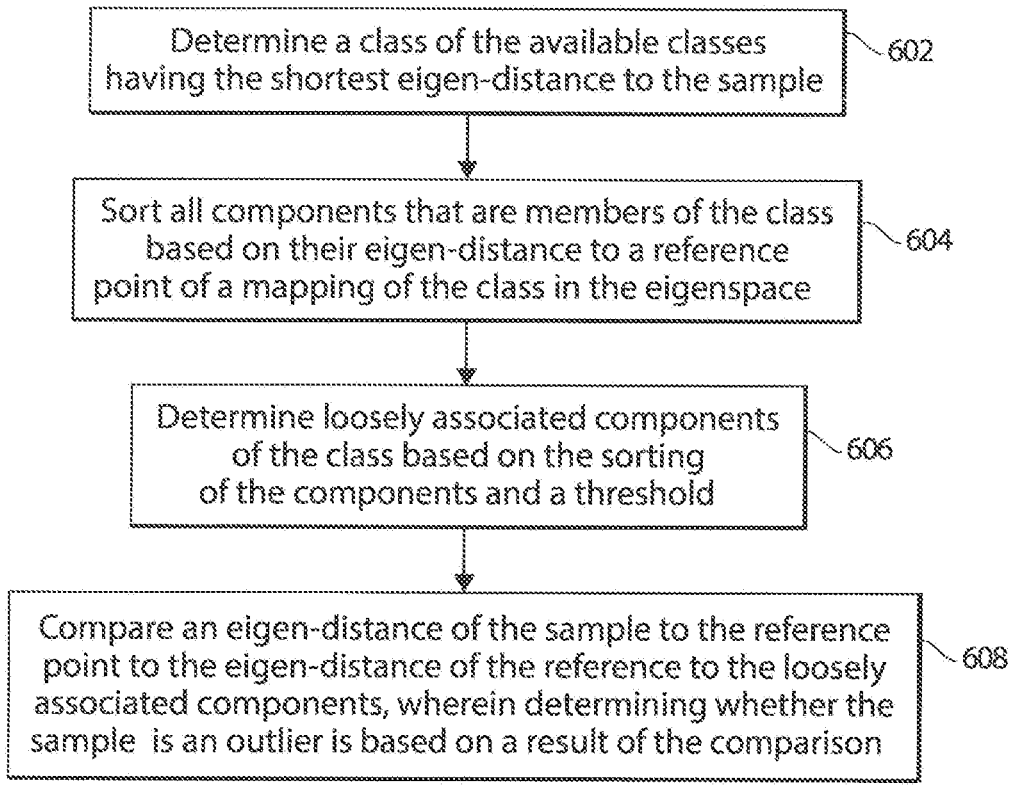
FIG. 6 illustrates a flowchart showing an example method performed by the classification system in accordance with still further embodiments of the disclosure.

With reference now to FIGS. 4-6, shown are flowcharts demonstrating implementation of the various exemplary embodiments. It is noted that the order of operations shown in FIGS. 4-6 is not required, so in principle, the various operations may be performed out of the illustrated order or in parallel. Also certain operations may be skipped, different operations may be added or substituted, or selected operations or groups of operations may be performed in a separate application following the embodiments described herein.

FIG. 4 shows a method performed by a classification system, such as classification system 100 shown in FIG. 1. At operation 402, components of a trained convolutional neural network (CNN) are accessed. The CNN has been previously trained by a training with available classes. The components are provided in a kernel space and include at least one of a plurality of kernels and a plurality of neurons of one or more layers of the CNN. The components are assigned to a class of the available classes in accordance with the training. At operation 404 a covariance matrix is applied to map the components in the kernel space to eigenspace. At operation 406, for each of the available classes, an eigen-distance between a sample and the components mapped to eigenspace is determined. At operation 408, based on the eigen-distance determined, a determination is made whether the sample is an outlier that does not belong to one of the classes. At operation 410, a new class that includes the sample is created if it is determined that the sample is an outlier. At operation 412, the CNN is retrained using the new class to include the new class with the available classes.

In embodiments, determining the eigen-distance for each of the available classes includes determining an SVD-based eigen-distance from the sample to each of the individual available classes.

In embodiments, determining the eigen-distance for each of the available classes is a function of the mean for the class.

In embodiments, the kernel space includes a kernel matrix for one or more of layers of at least one layer, or a final dense neuron output layer.

FIG. 5 shows a method performed by the classification system for building a taxonomy. At operation 502, points in the eigenspace are clustered into a plurality of clusters. At operation 504, a hierarchical closeness of the plurality of clusters is determined in Euclidean space. At operation 506, a taxonomy is created based on the hierarchical closeness of the plurality of clusters.

FIG. 6 shows a method performed by the classification system for determining whether a sample is an outlier relative to learned classes. At operation 602, a class of the available classes having the shortest eigen-distance to the sample is determined. At operation 604, components that are members of the class are sorted based on their eigen-distance to a reference point of a mapping of the class in the eigenspace. At operation 606, loosely associated components of the class are determined based on the sorting of the components and a threshold. At operation 608, an eigen-distance of the sample to the reference point is compared to the eigen-distance of the reference to the loosely associated components, wherein determining whether the sample is an outlier is based on a result of the comparison.

In embodiments, the method of FIG. 6 can include determining the reference point for the mapping of the class of the available classes in the eigenspace. In embodiments, the class having the shortest eigen-distance to the sample is determined as a function of a distance of the sample to the reference point of the mapping of the class.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the classification system 100 may be implemented or executed by one or more computer systems. For example, classification system 100 can be implemented using a computer system such as example computer system 700 illustrated in FIG. 7. In various embodiments, computer system 700 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 700 is only one example of a suitable system and is not intended to suggest any limitation as to the scope of use or functionality of embodiments of the disclosure described herein. Regardless, computer system 700 is capable of being implemented and/or performing any of the functionality set forth hereinabove.

Computer system 700 may be described in the general context of computer system-executable instructions, such as program modules, being executed by a computer system. Generally, program modules may include routines, programs, objects, components, logic, data structures, and so on that perform particular tasks or implement particular abstract data types. Computer system 700 may be practiced in distributed data processing environments where tasks are performed by remote processing devices that are linked through a communications network. In a distributed data processing environment, program modules may be located in both local and remote computer system storage media including memory storage devices.

Figure 7:
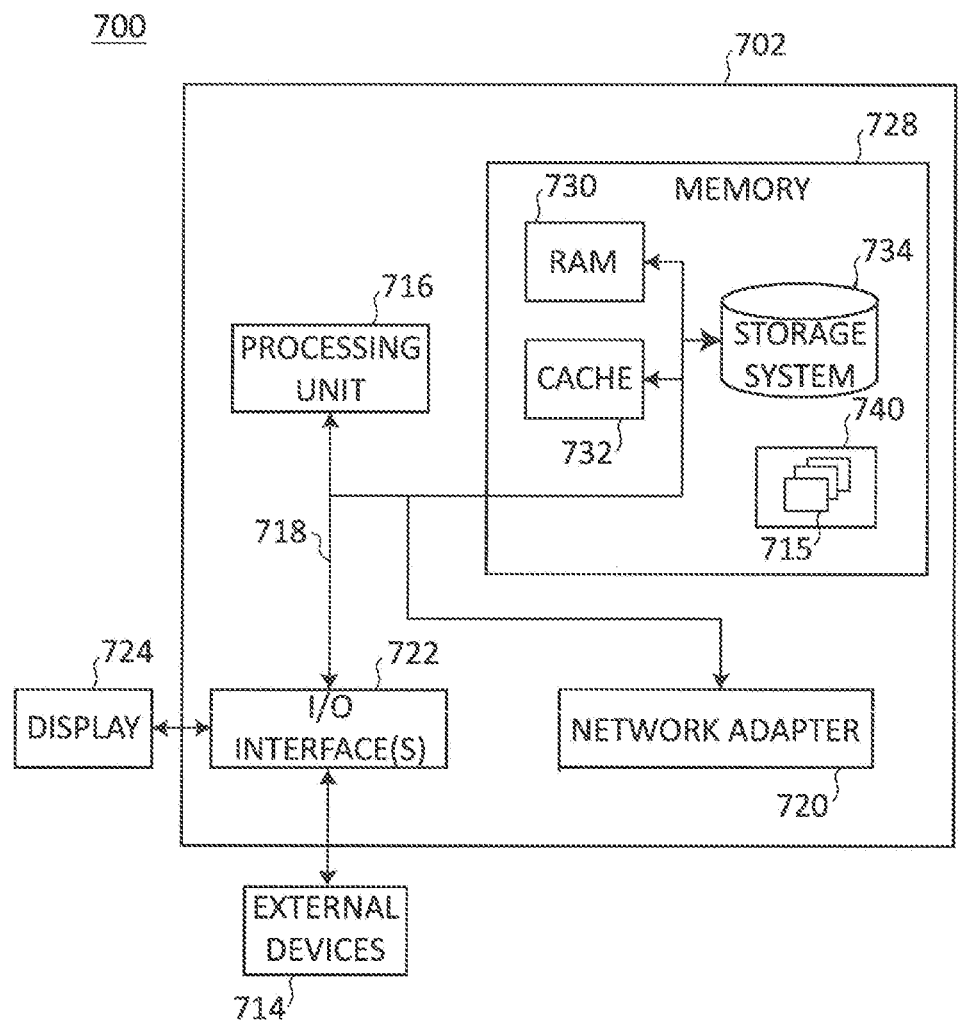
FIG. 7 illustrates a schematic block diagram of an example processing system of the classification system, in accordance with an illustrative embodiment of the present disclosure.

Computer system 700 is shown in FIG. 7 in the form of a general-purpose computing device. The components of computer system 700 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 700 typically includes a variety of computer system readable media. Such media may be any available media that is accessible by the classification system 100, and it includes both volatile and non-volatile media, removable and non-removable media.

System memory 728 can include computer system readable media in the form of volatile memory, such as random access memory (RAM) 730 and/or cache memory 732. Computer system 700 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the disclosure.

Program/utility 740, having a set (at least one) of program modules 715, such as the train and maintain unit 102, mapping CNN unit 104, outlier detection unit 106, and taxonomy building unit 108, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 715 generally carry out the functions and/or methodologies of embodiments of the disclosure as described herein.

Computer system 700 may also communicate with one or more external devices 714 such as a keyboard, a pointing device, a display 724, etc.; one or more devices that enable a user to interact with computer system 700; and/or any devices (e.g., network card, modem, etc.) that enable the classification system 100 to communicate with one or more other computing devices. Such communication can occur via Input/Output (I/O) interfaces 722. Still yet, computer system 700 can communicate with one or more networks such as a local area network (LAN), a general wide area network (WAN), and/or a public network (e.g., the Internet) via network adapter 720. As depicted, network adapter 720 communicates with the other components of the classification system 100 via bus 718. It should be understood that although not shown, other hardware and/or software components could be used in conjunction with computer system 700. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the disclosed method includes the ability to automatically identify new classes relative to learned classes in a kernel space. The kernel space is a simple but high-dimensional space that provides a basis for taxonomical classification. The kernel space can be applied to detect outliers of the learned classes using an eigen-distance metric. Advantageously, the classification system can classify objects, even when encountering a new model of a learned object, without having sufficient training data or when impracticable to provide intervention to reconfigure the classification system, such as when deployed in the field.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A computer-implemented method for automatically recognizing a new class in a classification system, the method comprising:
   accessing components of a trained convolutional neural network (CNN) that has been trained by a training with available classes, the components being provided in a kernel space and including at least one of a plurality of kernels and a plurality of neurons of one or more layers of the CNN, the components being assigned to a class of the available classes in accordance with the training;
   applying a covariance matrix to map the components in the kernel space to eigenspace;
   determining, for each of the available classes, an eigen-distance between a sample and the components mapped to eigenspace;
   based on the eigen-distance, determining whether the sample is an outlier that does not belong to one of the classes; and
   creating new class that includes the sample if determined that the sample is an outlier.

2. The method of claim 1, further comprising retraining the CNN using the new class and include the new class with the available classes.

3. The method of claim 1, further comprising:
   clustering points in the eigenspace into a plurality of clusters;
   determining a hierarchical closeness of the plurality of clusters in Euclidean space; and
   creating a taxonomy based on the hierarchical closeness of the plurality of clusters.

4. The method of claim 1, wherein determining, for each of the available classes, the eigen-distance comprises determining a singular value decomposition (SVD)-based eigen-distance from the sample to each of the individual available classes.

5. The method of claim 1, wherein determining, for each of the available classes, the eigen-distance is a function of the mean for each class.

6. The method of claim 1, further comprising:
   determining a class of the available classes having the shortest eigen-distance to the sample;
   sorting components that are members of the class based on their eigen-distance to a reference point of a mapping of the class in the eigenspace;
   determining loosely associated components of the class based on the sorting of the components and a threshold; and
   comparing an eigen-distance of the sample to the reference point to the eigen-distance to the reference of the loosely associated components,
   wherein determining whether the sample is an outlier is based on a result of the comparing.

7. The method of claim 6, further comprising determining the reference point for the mapping of the class of the available classes in the eigenspace.

8. The method of claim 6, wherein the class having the shortest eigen-distance to the sample is determined as a function of a distance of the sample to the reference point of the mapping of the class.

9. The method of claim 1, wherein the kernel space includes a kernel matrix for one or more of layers of at least one layer, or a final dense neuron output layer.

10. A classification system for automatically generating a new class in a classification system, classification system comprising:
   a memory configured to store instructions;
   a processor disposed in communication with the memory, wherein the processor upon execution of the instructions is configured to:
      access components of a trained convolutional neural network (CNN) that has been trained by a training with available classes, the components being provided in a kernel space and including at least one of a plurality of kernels and a plurality of neurons of one or more layers of the CNN, the components being assigned to a class of the available classes in accordance with the training;
      apply a covariance matrix to map the components in the kernel space to eigenspace;
      determine, for each of the available classes, an eigen-distance between a sample and the components mapped to eigenspace;

based on the eigen-distance, determine whether the sample is an outlier that does not belong to one of the classes; and create new class that includes the sample if determined that the sample is an outlier.

11. The classification system of claim 10, wherein the processor, upon execution of the instructions, is further configured to retrain the CNN using the new class and include the new class with the available classes.

12. The classification system of claim 10, wherein the processor, upon execution of the instructions, is further configured to:

cluster points in the eigenspace into a plurality of clusters;

determine a hierarchical closeness of the plurality of clusters in Euclidean space; and create a taxonomy based on the hierarchical closeness of the plurality of clusters.

13. The classification system of claim 10, wherein the processor, upon execution of the instructions, is further configured to:

determine a class of the available classes having the shortest eigen-distance to the sample;

sort components that are members of the class based on their eigen-distance to a reference point of a mapping of the class in the eigenspace;

determine loosely associated components of the class based on the sorting of the components and a threshold; and compare an eigen-distance of the sample to the reference point to the eigen-distance to the reference of the loosely associated components, wherein determining whether the sample is an outlier is based on a result of the comparison.

14. The classification system of claim 10, wherein the processor, upon execution of the instructions, is further configured to determine the reference point for the mapping of the class of the available classes in the eigenspace.

15. The classification system of claim 13, wherein the processor, wherein the class having the shortest eigen-distance to the sample is determined as a function of a distance of the sample to the reference point of the mapping of the class.

16. The classification system of claim 10, wherein the kernel space includes a kernel matrix for one or more of layers of at least one layer, or a final dense neuron output layer.

17. A non-transitory computer readable storage medium and one or more computer programs stored therein, the computer programs comprising instructions, which when executed by a computer system, cause the computer system to:

access components of a trained convolutional neural network (CNN) that has been trained by a training with available classes, the components being provided in a kernel space and including at least one of a plurality of kernels and a plurality of neurons of one or more layers of the CNN, the components being assigned to a class of the available classes in accordance with the training;

apply a covariance matrix to map the components in the kernel space to eigenspace;

determine, for each of the available classes, an eigen-distance between a sample and the components mapped to eigenspace;

based on the eigen-distance, determine whether the sample is an outlier that does not belong to one of the classes; and create new class that includes the sample if determined that the sample is an outlier.

18. The non-transitory computer readable storage medium of claim 17, wherein the computer system, upon execution of the instructions, is further caused to retrain the CNN using the new class and include the new class with the available classes.

19. The non-transitory computer readable storage medium of claim 17, wherein the computer system, upon execution of the instructions, is further caused to:

cluster points in the eigenspace into a plurality of clusters;

determine a hierarchical closeness of the plurality of clusters in Euclidean space; and create a taxonomy based on the hierarchical closeness of the plurality of clusters.

20. The non-transitory computer readable storage medium of claim 17, wherein the computer system, upon execution of the instructions, is further caused to:

determine a class of the available classes having the shortest eigen-distance to the sample;

sort components that are members of the class based on their eigen-distance to a reference point of a mapping of the class in the eigenspace;

determine loosely associated components of the class based on the sorting of the components and a threshold; and compare an eigen-distance of the sample to the reference point to the eigen-distance to the reference of the loosely associated components, wherein determining whether the sample is an outlier is based on a result of the comparison.

* * * * *